G. E. BRADSHAW.
PETROL ENGINE BEARING.
APPLICATION FILED MAR. 12, 1917.
1,301,094.
Patented Apr. 22, 1919.
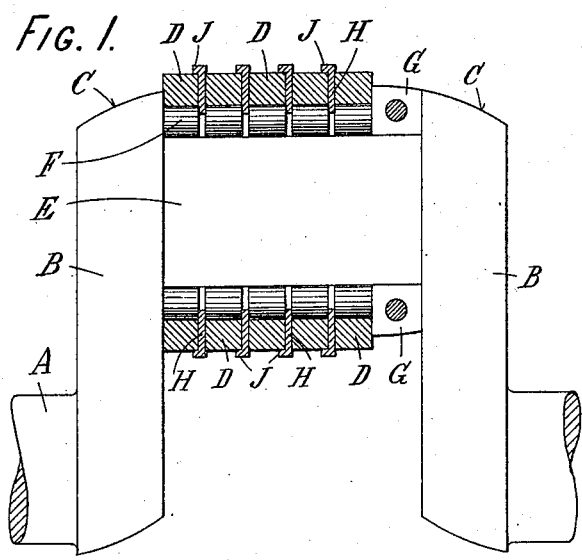
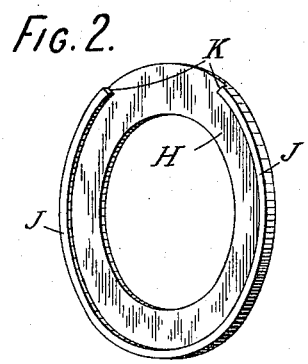
Inventor,
Granville E. Bradshaw
per Arthur H. Stanley
Attorney.

UNITED STATES PATENT OFFICE.

GRANVILLE E. BRADSHAW, OF HERSHAM, WALTON-ON-THAMES, ENGLAND.

PETROL-ENGINE BEARING.

1,301,094.   Specification of Letters Patent.   Patented Apr. 22, 1919.

Application filed March 12, 1917.   Serial No. 154,356.

*To all whom it may concern:*

Be it known that I, GRANVILLE EASTWOOD BRADSHAW, a subject of the King of Great Britain and Ireland, of A. B. C. Motor Works, Hersham, Walton-on-Thames, in the county of Surrey, England, have invented new and useful Improvements in Petrol-Engine Bearings, of which the following is a specification.

The object of the present improvements is mainly to shorten the length of the bearing, whether dealing with the engine shaft or the crank pin, whereby each or either of these can be made considerably shorter, as hereinafter described, even though carrying the same, or possibly a greater, number of connecting rod ends of the same size as formerly. The result of such close spacing must be to improve the efficiency of the engine, more particularly in the case of several cylinders working upon one crank, inasmuch as a short crank shaft is obviously preferable to a long one, and the balance of the engine when running is also considerably improved. The invention furthermore expedites the fitting or assembling of the parts of the bearing.

A further object is to enable roller bearings to be applied without the necessity of splitting or dividing the end of the connecting rod.

I attain these objects by the devices illustrated in the accompanying drawings, in which—

Figure 1 is a sectional view of a crank to which my said improvements are applied, and Fig. 2 a detail in perspective.

Referring to the drawings, the crankshaft A has a web B which is beveled or rounded at its extremities C for facilitating the passing of a ring over the same, such as the end of a connecting rod. Such connecting rod forms an unbroken outer race for the rollers of the bearing, which run direct upon the crank pin.

The connecting rod ends D (Fig. 1 showing five, as an example only) encircling the crankpin E, together with the rollers F, are separated at their sides by means of thin annular plates or disks H, the inside diameter of which is less than that of the ends D, the purpose of this difference being to separate one set of rollers also from the adjacent set. The internal diameter of these disks H is nevertheless large enough to allow them to be threaded over the crank webs on to the crankpin in the same manner as the connecting rod ends, and this is made possible despite the smaller diameter of the disk hole, largely, if not entirely, because of the disk being much thinner than the connecting rod.

The thin disks H which may be made of hardened steel, bronze or any suitable material, are provided each with a flange or shoulder J (Fig. 2) adapted to overlap the adjacent rod end D upon the edge of its outer periphery. This will keep the disks in proper concentric position, but any other means may nevertheless be adopted for such purpose. The flanges J have a gap, such as K (Fig. 2) in one place for the connecting rod shank to pass through.

The outer periphery of the plates or disks need not be circular but may have any desired contour.

After supplying the crankpin E with the desired number of connecting rod ends D, rollers F, and the separating disks H, the remaining space on the crankpin is finally filled up by the split collar G. When this is done, the first placed rod end and its rollers are retained on the crankpin by the broad face of the web B, but if desired, such a collar as G may be used at both ends of the crankpin or other bearing, and obviously, it need not imperatively occupy the whole remaining space if a short bearing upon an unnecessarily long crankpin, for example, is desired.

I claim:—

1. In combination, a crank pin or shaft constituting an inner race common to a plurality of roller bearings, a plurality of integral rings constituting independent outer races of the same, and of such size as to be capable of passing along the shaft and over any crank webs thereon, a plurality of circles of rollers, such circles being in the annular space left between said outer races and the inner race aforesaid, means for separating each circle of rollers from any adjacent rollers, and a removable split ring on the same pin or shaft for preventing lateral displacement of said rollers and rings.

2. In combination, a crank pin or shaft constituting an inner race common to a plurality of roller bearings, a plurality of integral rings constituting independent outer races of the same, a plurality of circles of rollers, such circles being in the annular space left between said outer races and the inner race aforesaid, a plurality of thin annular disks for separating each circle of rollers from any adjacent rollers, and a removable split ring on the same pin or shaft for preventing lateral displacement of said rollers, rings and disks.

GRANVILLE E. BRADSHAW.

Copies of this patent may be obtained for five cents each, by addressing the "Commissioner of Patents, Washington, D. C."